Patented Mar. 8, 1932

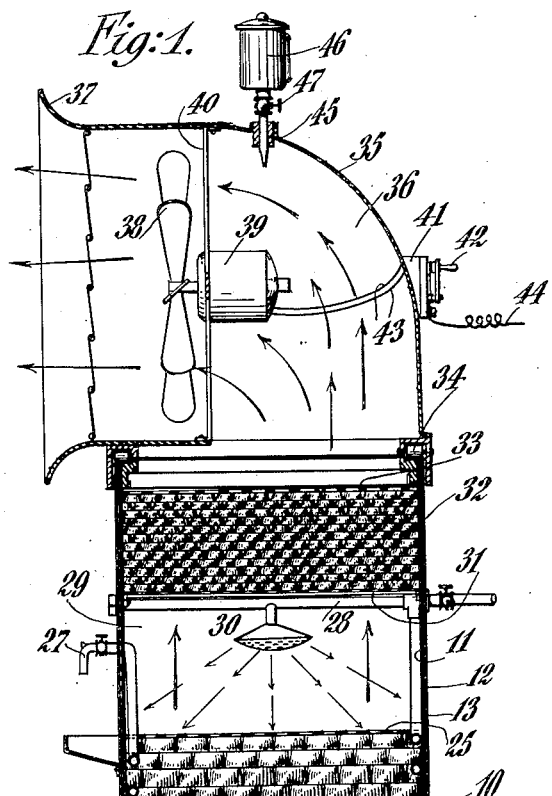

1,848,576

UNITED STATES PATENT OFFICE

HANS HERMANN SANDEL, OF BROOKLYN, NEW YORK

SELF-CONTAINED AIR FILTERING AND COOLING APPARATUS

Application filed February 25, 1929. Serial No. 342,412.

My invention relates to a self-contained air filtering and cooling apparatus.

The present invention has for its particular object the provision of a simple, compact, self-contained apparatus of the above mentioned character, and one which is portable and can be readily, as an entity structure, moved into and installed within any room in a home, or in a hospital, or in any place where it is desired to clean, purify, medicate or scent the air. It is well known that persons who are ill, feeble, convalescent, and especially those suffering from respiratory diseases, are greatly benefited by breathing air which is pure, cool and medicated.

Where persons are suffering from a cold, influenza, or the like, it is very desirable and advisable, not only for the benefit of the sufferers themselves but also as a precautionary measure for safeguarding the attendants, to keep the atmosphere of the sick room constantly purified or fumigated. It is therefore the aim of the present invention to provide a portable self-contained apparatus of the character described, one capable of being readily installed in any room or place where purified and medicated air is likely to be beneficial.

More specifically, the invention involves an apparatus wherein the air to be purified and cooled is drawn upwardly by virtue of the suction produced by a rotor, wherein it is drawn upwardly through a coiled mesh arrangement constituting a multiplicity of air impinging baffles adapted to remove the dust, and wherein as the air is drawn upwardly through the tortuous course produced by the filtering baffles, it is washed by being intermingled with a falling spray of water or other fluid. Having been washed, the air is drawn by suction through the spraying chamber and thence through a section of baffles designed to remove excess moisture; whereupon the air is drawn through the medicating or fumigating chamber and thence expelled into the room.

According to one characteristic feature of my invention, that portion of the apparatus which comprises the outlet funnel through which the air is expelled into the room, is mounted for free manual rotation so that the current of expelled air can be directed into any part of the room desired.

According to another characteristic feature, the apparatus contains a water coil wherein water may be cooled for drinking purposes.

Other objects and aspects of the invention will appear hereinafter.

The invention consists in the construction and in the combination or combinations of parts hereinafter described and particularly pointed out in the annexed claims.

The invention will be best understood by reference to the accompanying drawings, forming a material part of this application, and in which:

Figure 1 represents a view in sectional elevation of my self-contained apparatus;

Fig. 2 is a view on an enlarged scale, more or less diagrammatic in character, showing in plan an assembly of the filtering coils;

Fig. 3 is a section and elevation, taken on the line 3—3 of Fig. 2; and

Fig. 4 represents a vertical sectional view on an enlarged scale, taken transversely through a strand of the coil winding.

The preferred form of cconstruction, as illustrated in the accompanying drawings, comprises an upright casing referred to in general by the numeral 10 and composed of an inner lining 11 of aluminum, an intermediate layer 12 of asbestos or the like, and an outer sheathing 13 of any suitable sheet material. This casing, which is provided with a suitable water draining bottom 14 having a central outlet opening 15, is secured upon a suitable base structure 16. Arranged in the base structure is a suitable drain pipe 17 which extends from the bottom outlet opening 15. Just above the drain bottom 14, the casing is provided with a series of spaced apart air inlet openings 18; and immediately above these openings there is mounted upon a suitable ledge or bracket 19 a screen 20 which extends transversely across the interior of the casing and upon which is mounted a filtering section comprising a mass of filtering coils 21. By referring to Fig. 1, it will be seeen that these filtering coils 21 are arranged in superposed order, tier upon tier, the coils of each tier or series being in staggered relation to the coils of the adjoining tier or series.

According to an important feature of my invention, each filtering coil or unit is so produced from a ribbon of sheet metal, preferably of aluminum, that its windings 22 are spaced apart to provide a curved or spiral gap 23.

According to another characteristic feature of my invention, the windings of the coils are, in vertical section, as clearly illustrated in Fig. 4, of gradually increasing thickness from their top edges so as to provide a somewhat bulbous lower portion 24, it being desirable in this regard to provide windings which in vertical section substantially simulate the vertical sectional form of a falling drop of water. When the filtering coils, thus formed, are arranged in staggered superposed relation, as shown in Fig. 1, there is provided in effect a multiplicity of vertically extending tortuous passages; and in each filtering coil, partially filling the curved gap 23 therein, are the enlarged or bulbous portions 24 of the adjacent windings 22, such enlarged portions 24 constituting impinging faces or baffles for flowing currents of air and water.

This mass of filtering coils, which may be conveniently referred to as a lower section of coils, is held in place from above by a suitable retaining screen 25; and by preference there is arranged within the casing below the screen 25 in this lower filtering section a suitable water coil 26 which communicates with a suitable dispensing faucet 27 located exteriorly of the casing where drinking water may be obtained. The water for the coil 26 is taken from a supply pipe 28 arranged in the upper portion of a spraying chamber 29 and extending outwardly from the casing for connection with a suitable source of water supply. Depending from the supply pipe 28 is a suitable device 30 for spraying water downwardly upon the lower section of filtering coils. Extending across the interior of the casing above the spraying chamber 29 is a supporting screen 31 upon which is arranged an upper section 32 of filtering coils which are precisely like those comprising the lower section, except that by preference these coils are of less size and the mass therein is smaller. This upper section of filtering coils may be held in place upon the screen 31 by means of a top screen 33.

Mounted upon the top end of the casing by means of suitable anti-friction devices 34 is a rotatable hood 35 containing a chamber 36 in which medicaments, disinfectants, perfumes or the like may be sprayed or distributed. This hood 35 is made with a horn-shaped portion 37 affording an outlet opening through which the air is expelled into the room. For drawing the air to be purified inwardly through the inlet openings 18, thence upwardly through the multiplicity of tortuous passageways provided by the lower filtering section, and then upwardly in succession through the spray chamber 29, upper filtering section 32 and medicated chamber 26, there is provided a suitable rotor device 38, which is operated by a motor 39 fixed upon a support 40 within the hood.

In the illustrative embodiment, for controlling the operation of the motor, I show more or less diagrammatically a rheostat device 41 provided with a control switch 42, which rheostat device may be connected to the motor by circuit conductors 43 and as well to a suitable source of electrical supply by wiring 44. For distributing or spraying, as may be preferred, disinfectants, medicaments, perfumes or the like into the chamber 36 for intimate association with the cleaned and cooled air, which is being drawn therethrough, I provide, suitably secured in the top portion of the hood, a nozzle device 45 which supports a suitable supply container 46, the nozzle device 45 being equipped with a suitable valve 47 whereby to control the liquid to be sprayed or distributed.

In operation, by means of the rotor 38, the air is drawn into the casing through the inlet openings 18 and thence upwardly through the lower section of filtering coils where it strikes against the numerous impinging faces of the coil winding; and, at the same time, the sprayed water in coursing downwardly, falls through the ascending current of air and upon the impinging faces of these filtering coils, whereby the air and water are intimately intermixed so as to wash the air and remove therefrom particles of dust and impurities. Concurrently with the washing operation, the air is cooled, since it is contacting intimately with the cool filtering coils and with the cool water. From the lower section of filtering coils, the air is drawn upwardly through the spraying chamber and thence through the upper section of filtering coils, which serve to further cool the air and particularly to remove from it all excess moisture. From the upper section of filtering coils, the cleaned, cooled and dried air is drawn through the chamber 36 where it is fumigated or medicated accordingly as desired, and thence it is expelled into the room by the operation of the rotor.

From the foregoing description taken in connection with the accompanying drawings it will be evident that I have provided a very practical self-contained air filtering and cooling apparatus, and one which is so constructed and arranged that it may be readily installed in any room or place in which electricity is available for the operation of the motor, in which the water supply pipe 28 can be extended or coupled to a source of water supply, and in which the water drain pipe 17 can be connected with suitable drain means.

While I have thus illustrated and described the preferred form of my invention, it will be understood that changes and alterations may be made therein, to which changes and alterations I am entitled, provided the same are effected within the scope of the annexed claims.

I claim:

1. In combination, an upright casing; a hood thereon; upper and lower sections of filtering means within the casing and consisting of a multiplicity of metallic sheet coils with spaced windings; a spray chamber between the sections and a device arranged therein for spraying liquid downwardly upon the lower section; and means in the hood for drawing a current of air upwardly through the lower section, the spray chamber and the upper section.

2. In combination, an upright casing; upper and lower sections of filtering means within the casing and consisting of a multiplicity of metallic sheet coils with spaced windings; a spray chamber between the sections and a device arranged therein for spraying liquid to pass downwardly through the lower section; a rotatable hood on the casing forming an air outlet; and means in the hood for drawing a current of air upwardly through the lower section, the spray chamber and the upper section and for expelling it through said air outlet.

3. In combination, an upright casing; upper and lower sections of filtering means within the casing and consisting of a multiplicity of metallic sheet coils with spaced windings; a spray chamber between the sections and a device arranged therein for spraying liquid to pass downwardly through the lower section; a rotatable hood on said casing forming an air medicating chamber and an air outlet; and means in the hood for drawing a current of air upwardly through the lower section, spray chamber, upper section and medicating chamber and for expelling it through said air outlet.

4. In a device of the character described, consisting of a casing provided with filtering means and a device arranged to spray water upon the same, a water coil arranged in said filtering means, to be cooled by the water sprayed thereon, a hood arranged on the casing and forming an air outlet, and means comprising a rotor in the hood for drawing a current of air upwardly through the filtering means and sprayed water whereby said air is washed and cooled, and for expelling the washed and cooled air through said air outlet.

5. In a device of the character described, consisting of a container and means therein for causing air and water to course in opposite directions; a mass of baffle walls within the container arranged to define a multiplicity of tortuous passageways through which the air and water pass in opposite directions, said baffle walls being composed of coils having spaced windings, and said windings increasing in thickness from one edge thereof to provide protruding faces between the windings for impingement by the air and water whereby intimately to intermix the same as they pass between the windings of the coils.

6. A filtering assembly for cleaners comprising a mass of coils with spaced windings including baffles thereon arranged in staggered superposed series, the spaced windings of each coil being in a flat plane.

7. A filtering assembly for cleaners comprising a series of coils with spaced windings including baffles thereon arranged in superposed relation to provide tortuous passageways, the spaced windings of each coil being in a flat plane.

8. Filtering means comprising coiled sheet metal having enlarged portions on the faces thereof, the windings of the coils being spaced apart in the same plane to provide curved gaps, said enlarged portions partially filling said gaps and providing impinging surfaces therein for the material to be filtered.

9. A self-contained apparatus for filtering air, comprising an upright casing, a multiplicity of metallic sheet filtering coils including baffles thereon with spaced windings placed across the interior of the casing, a device for spraying liquid downwardly upon the coils and windings, spaced air inlet openings below the lower extremity of said coils, means for causing air to be drawn in through said openings and flow upwardly through the coils and windings counter to a downward stream of liquid, and means above the spraying device for causing the air to deposit its moisture, said means consisting of metallic sheet coils with spaced windings whereby the air passing out through said apparatus is cooled and freed of any dust particles formerly contained therein.

In testimony that I claim the foregoing as my invention, I have signed my name hereto.

HANS HERMANN SANDEL.